April 15, 1924.
G. Y. LAUCHIN
PISTON CONSTRUCTION
Filed Nov. 28, 1921
1,490,114
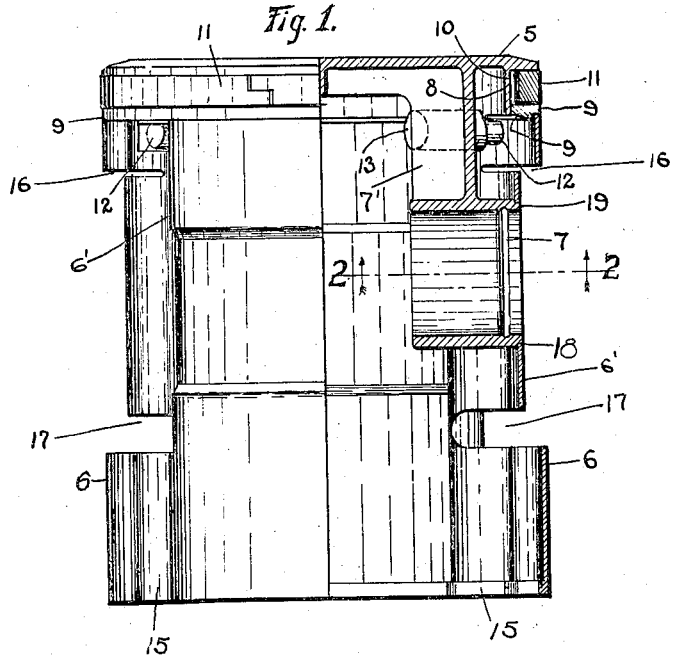
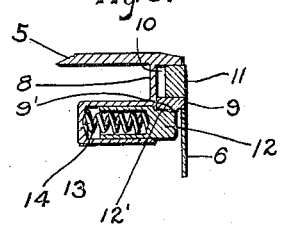
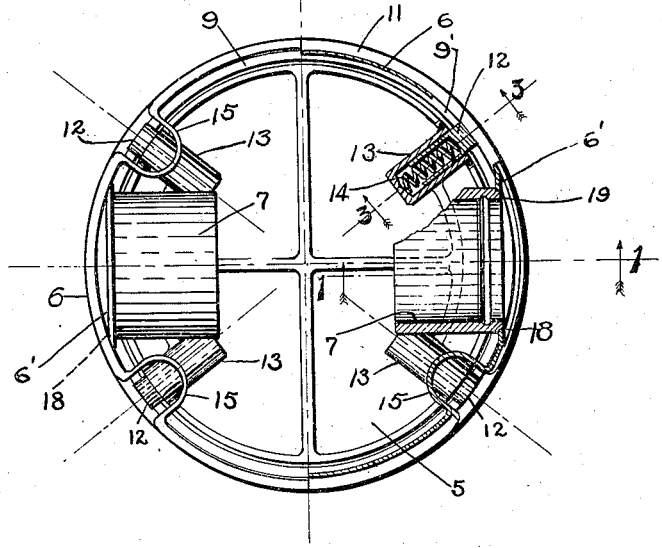
INVENTOR.
George Y. Lauchin
BY Morsell & Keeney
ATTORNEYS.

Patented Apr. 15, 1924.

1,490,114

UNITED STATES PATENT OFFICE.

GEORGE Y. LAUCHIN, OF GREEN BAY, WISCONSIN.

PISTON CONSTRUCTION.

Application filed November 28, 1921. Serial No. 518,308.

*To all whom it may concern:*

Be it known that I, GEORGE Y. LAUCHIN, a citizen of the United States, and resident of Green Bay, in the county of Brown and State of Wisconsin, have invented new and useful Improvements in Piston Constructions, of which the following is a description, reference being had to the accompanying drawings, which are a part of this specification.

This invention relates to improvements in piston construction more particularly adapted for internal combustion engines.

It is one of the objects of the invention to provide a piston construction which while light in weight is strong, durable and effective in operation.

A further object of the invention is to provide a piston construction in which the ring grooves are adapted to automatically fit piston rings which vary in width so that a snug joint is always assured and a less number of piston rings may be used.

A further object of the invention is to provide a piston construction in which the skirt or cylindrical portion of the piston is shaped to permit flexing without interfering with the rigidity of the piston rod connection with the thrust or end portion of the piston.

A further object of the invention is to provide a piston construction in which the head of the piston is formed of cast metal and the skirt is formed of tubular metal shaped to permit flexing.

A further object of the invention is to provide a piston construction having a very simple means for compensating for wear at the side edge portions of the piston ring.

With the above and other objects in view the invention consists of the improved piston construction and its parts and combinations as set forth in the claims, and all equivalents thereof.

In the accompanying drawing in which the same reference characters indicate the same parts in all of the views:

Fig. 1 is in part a side view of the improved piston, one half portion being shown in section;

Fig. 2 is in part an inverted end view of one-half portion of the piston, the other half being taken on line 2—2 of Fig. 1; and Fig. 3 is a sectional detail view taken on line 3—3 of Fig. 2.

Referring to the drawing, the numeral 5 indicates the head, 6 the skirt or cylindrical portion of the piston and 7 the connecting rod pin bearing of the improved piston. The head 5 is a casting and the pin bearings 7 are of alined tubular form and connected to the head by ribs 7' to form an integral rigid part thereof. Said head is also formed with a downwardly depending annular flange 8 of less diameter than the head to form, in connection with an adjusting ring 9 surrounding the flange, an annular piston ring groove 10 for receiving a piston ring 11. The lower edge portion 9' of the adjusting ring 9 is angled inwardly and upwardly and is engaged by radially extending plungers 12 which have outwardly, downwardly extending upper angular faces 12'. Said angular faces 12' bear against the lower angular face 9' of the adjusting ring 9 and hold said ring yieldingly in its upper position as clearly shown in Fig. 3. The plungers 12 are yieldingly positioned in cylindrical members 13 preferably formed integral with the flange 8 and said cylinders are provided with coiled springs 14 interposed between the plungers and the inner ends of the cylinders so that the plungers will yieldingly hold the adjustable ring upwardly in engagement with the piston ring and form a snug connection between the piston ring and the walls of the parts forming the piston ring groove.

The skirt or cylindrical portion 6 of the cylinder is shaped from sheet or tubular metal formed with longitudinally extending inwardly turned flexible groove portions 15 and transversely extending slotted portions 16 and 17. The slotted portions 16 and 17 are positioned on diametrically opposite sides of the skirt of the piston with the slots 16 positioned above the pin bearings 7 and the slots 17 below said pin bearings to form the flattened side portions 6' having openings 18 through which the outer shouldered end portions 19 extend and the parts are preferably welded together. The flattened side portions 6' of the skirt snap over the shouldered end portions of the bearings 7 and the skirt 6 is held in position thereby. The upper edge portion of the skirt terminates just below the adjustable ring 9 so as not to interfere with the slidable movement of said ring.

The grooved portions 15 of the skirt extend on opposite sides of the bearings 7 and extend from the lower to the upper edges thereof and permit the free flexing of any portion of the skirt except the flattened portions 6'.

From the foregoing description, it will be seen that the improved piston provides a close fit between the side walls of the piston ring groove and the ring and that means are provided for compensating for wear to always form a close fit.

Furthermore, the construction provides a very light weight piston requiring only one piston ring and the flexible skirt permits the piston to easily fit cylinders which may be out of true with respect to cylindrical bores.

What I claim as my invention is:

1. A piston construction, comprising a head member having a piston ring groove, and connecting rod pin bearings, and a cylindrical skirt member of comparatively thin metal connected to the head member and having inwardly extending flexible grooved portions and openings in register with the openings in the bearings.

2. A piston construction, comprising a head member having a piston ring groove and connecting rod pin bearings, and a cylindrical skirt member of comparatively thin metal having side openings through which the pin bearings extend, said skirt member also having longitudinally extending inwardly turned grooves positioned on opposite sides of the bearings.

3. A piston construction, comprising a head member having a piston ring groove and connecting rod pin bearings, and a cylindrical skirt member of comparatively thin metal having flattened side portions provided with side openings through which the pin bearings extend, said skirt member also having longitudinally extending inwardly turned grooves positioned on opposite sides of the bearings to permit flexing of the skirt.

4. A piston construction, comprising a head member having connecting rod pin bearings and a piston ring groove formed of three walls, one of said walls being in the form of a ring slidably mounted on the head member and having a beveled side edge portion, plungers carried by the head member and having beveled portions which engage the beveled edge portions of the wall ring, springs yieldingly engaging the plungers, and a flexible skirt member connected to the head.

5. A piston construction, comprising a head member having connecting rod pin bearings and a piston ring groove formed of three walls, one of said walls being in the form of a ring slidably mounted on the head member and having a beveled side edge portion, plungers carried by the head member and having beveled portions which engage the beveled edge portions of the wall ring, springs yieldingly engaging the plungers, and a flexible skirt member having flattened side portions provided with openings through which the pin bearings extend.

6. A piston construction, comprising a head member having connecting rod pin bearings and a piston ring groove formed of three walls, one of said walls being in the form of a ring slidably mounted on the head member and having a beveled side edge portion, plungers carried by the head member and having beveled portions which engage the beveled edge portions of the wall ring, springs yieldingly engaging the plungers, and a flexible skirt member having flattened side portions provided with openings through which the pin bearings extend, said skirt member also having longitudinally extending inwardly turned grooves positioned on opposite sides of the bearings to permit flexing of the skirt.

7. A piston construction, comprising a head member having shouldered connecting rod pin bearings and a piston ring groove formed of three walls, a piston ring within the groove, one of said walls being in the form of a ring slidably mounted on the head member and having beveled side edge portions, radially extending cylinders carried by the head member and having outer open ends, plungers extending into said cylinders and having outer end beveled portions which engage the beveled edge portions of the wall ring to yieldingly hold said ring against the piston ring, springs positioned within the cylinders between the plungers and the inner ends of the cylinders, and a flexible skirt member of comparatively thin metal having flattened side portions with openings through which the shouldered end portions of the pin bearings extend and are fastened thereto, said skirt having transverse slots positioned above and below the flattened portions and also having longitudinally extending inwardly turned grooves positioned on opposite sides of the bearings to permit flexing of the skirt.

In testimony whereof, I affix my signature.

GEORGE Y. LAUCHIN.